United States Patent [19]

Frank et al.

[11] 4,357,181

[45] Nov. 2, 1982

[54] HYDROXYBENZYL AMINES AS CORROSION INHIBITORS AND PAINT ADHESION PROMOTERS

[75] Inventors: Dieter Frank, Naperville; Lincoln D. Metcalfe, Lagrange, both of Ill.

[73] Assignee: Akzona Incorporated, Asheville, N.C.

[21] Appl. No.: 304,525

[22] Filed: Sep. 21, 1981

[51] Int. Cl.$^3$ .............................................. C23C 1/10
[52] U.S. Cl. .............................. 148/6.14 R; 106/14.15; 427/410; 428/457; 148/31.5
[58] Field of Search ................ 106/14.15; 148/6.14 R, 148/31.5; 427/410, 388.1, 388.4, 388.5; 428/457

[56] References Cited

U.S. PATENT DOCUMENTS 4,310,592 1/1982 Schmitz ............................ 428/457

Primary Examiner—Sam Silverberg
Attorney, Agent, or Firm—Francis W. Young; Robert F. Green

[57] ABSTRACT

A method for inhibiting corrosion of a metal surface is disclosed. The method comprises contacting said metal surface with a corrosion inhibitor of the formula

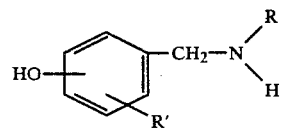

wherein R is selected from the group consisting of aliphatic radicals containing from about 6 to about 22 carbon atoms, $R_1\text{-}(C_mH_{2m})\text{-}$ wherein $R_1$ is alkoxy containing from 6 to 22 carbon atoms and m is an integer of from 2 to 6, and

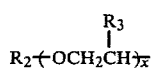

wherein $R_2$ is alkyl containing from 1 to 20 carbon atoms, x is an integer of from 1 to 10 and each $R_3$ is independently hydrogen or methyl; and R' is selected from the group consisting of hydrogen, $C_1$-$C_{12}$ alkyl, and $C_1$-$C_{12}$ alkoxy, at a temperature and for a period of time sufficient to inhibit corrosion of said metal surface.

A method for pretreating a metal surface to improve the adhesion of paint thereto is disclosed. The method comprises contacting said metal surface with an adhesion promoter of the formula

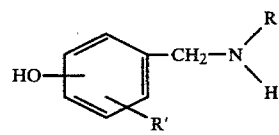

wherein R is selected from the group consisting of aliphatic radicals containing from about 6 to about 22 carbon atoms, $R_1\text{-}(C_mH_{2m})\text{-}$ wherein $R_1$ is alkoxy containing from 6 to 22 carbon atoms and m is an integer of from 2 to 6, and wherein $R_2$ is alkyl containing from 1 to 20 carbon atoms, x is an integer of from 1 to 10 and each $R_3$ is independently hydrogen or methyl; and R' is selected from the group consisting of hydrogen, $C_1$-$C_{12}$ alkyl, and $C_1$-$C_{12}$ alkoxy, at a temperature and for a period of time sufficient to improve the adhesion of paint to said surface.

A method for painting a metal surface is disclosed. The method comprises contacting said metal surface with an adhesion promoter of the formula wherein R is selected from the group consisting of aliphatic radicals containing from about 6 to about 22 carbon atoms, $R_1\text{-}(C_mH_{2m})\text{-}$ wherein $R_1$ is alkoxy containing from 6 to 22 carbon atoms and m is an integer of from 2 to 6, and wherein $R_2$ is alkyl containing from 1 to 20 carbon atoms, x is an integer of from 1 to 10 and each $R_3$ is independently hydrogen or methyl; and R' is selected from the group consisting of hydrogen, $C_1$-$C_{12}$ alkyl, and $C_1$-$C_{12}$ alkoxy, at a temperature and for a period of time sufficient to improve the adhesion of paint to said surface and applying paint to said metal surface.

4 Claims, No Drawings

HYDROXYBENZYL AMINES AS CORROSION INHIBITORS AND PAINT ADHESION PROMOTERS

BACKGROUND OF THE INVENTION

This invention relates to a method for inhibiting corrosion of a metal surface, to a method for pretreating a metal surface to improve the adhesion of paint thereto and to a method for painting a metal surface.

Corrosion of metal surfaces is a long-recognized problem to which many solutions have been proposed. Among others, various amines have been proposed as corrosion inhibitors. Of course, not all amines function as corrosion inhibitors and selection of an appropriate amine to function in a given environment continues to present difficulties. The present invention provides a new class of amines which are useful as corrosion inhibitors.

One means of minimizing the impact of corrosion on metal surfaces has been to coat the surface with paint. The paint acts as a barrier between the metal surface and the environment and thus helps to prevent or at least minimize corrosion of the metal surface. However, one problem associated with this solution is that paint does not always adhere properly to the metal surface. The result may be peeling, cracking, blistering, or flaking of the paint, thus rendering the substrate metal surface again subject to corrosion.

To alleviate the problem of poor adhesion of paint to metal surfaces one solution has been to subject the metal substrate to a treatment which is known as phosphatizing. Such a treatment typically assists in rendering the metal surface less subject to corrosive attack and at the same time rendering the surface more suitable for application of paint. The resulting bond between the metal surface and the paint is thus greatly improved.

The phosphatizing process thus provides one means for inhibiting corrosion of a metal surface as well as a means for promoting adhesion of paint to a metal surface. However, phosphatizing baths require that precise formulations be maintained and processing procedures and conditions of operations must be controlled within narrow limits. The phosphatizing process also requires that the metal surface be given two rinses subsequent to the phosphatizing bath, one a water rinse and the final rinse in a passivating solution.

A need thus exists for a simple means to achieve results similar to that obtained with a phosphatizing process, but without the complexity of such a treatment.

SUMMARY OF THE INVENTION

The present invention provides a method for inhibiting corrosion of a metal surface, comprising contacting said metal surface with a corrosion inhibitor of the formula

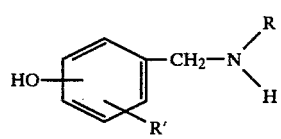

wherein R is selected from the group consisting of aliphatic radicals containing from about 6 to about 22 carbon atoms, $R_1\text{-}(C_mH_{2m})\text{-}$ wherein $R_1$ is alkoxy containing from 6 to 22 carbon atoms and m is an integer of from 2 to 6, and

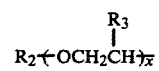

wherein $R_2$ is alkyl containing from 1 to 20 carbon atoms, x is an integer of from 1 to 10 and each $R_3$ is independently hydrogen or methyl; and R' is selected from the group consisting of hydrogen, $C_1$-$C_{12}$ alkyl, and $C_1$-$C_{12}$ alkoxy, at a temperature and for a period of time sufficient to inhibit corrosion of said metal surface.

The present invention also provides a method for pretreating a metal surface to improve the adhesion of paint thereto comprising contacting said metal surface with an adhesion promoter of the formula

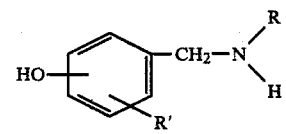

wherein R is selected from the group consisting of aliphatic radicals containing from about 6 to about 22 carbon atoms, $R_1\text{-}(C_mH_{2m})\text{-}$ wherein $R_1$ is alkoxy containing from 6 to 22 carbon atoms and m is an integer of from 2 to 6, and

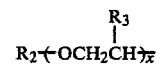

wherein $R_2$ is alkyl containing from 1 to 20 carbon atoms, x is an integer of from 1 to 10 and each $R_3$ is independently hydrogen or methyl; and R' is selected from the group consisting of hydrogen, $C_1$-$C_{12}$ alkyl, and $C_1$-$C_{12}$ alkoxy, at a temperature and for a period of time sufficient to improve the adhesion of paint to said surface.

There is additionally provided by the present invention a method for painting a metal surface comprising contacting said metal surface with an adhesion promoter of the formula

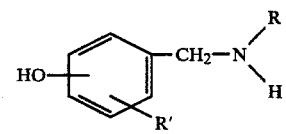

wherein R is selected from the group consisting of aliphatic radicals containing from about 6 to about 22 carbon atoms, $R_1\text{-}(C_mH_{2m})\text{-}$ wherein $R_1$ is alkoxy containing from 6 to 22 carbon atoms and m is an integer of from 2 to 6, and

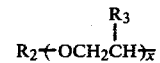

wherein $R_2$ is alkyl containing from 1 to 20 carbon atoms, x is an integer of from 1 to 10 and each $R_3$ is independently hydrogen or methyl; and R' is selected from the group consisting of hydrogen, $C_1$-$C_{12}$ alkyl, and $C_1$-$C_{12}$ alkoxy, at a temperature and for a period of time sufficient to improve the adhesion of paint to said surface, and applying paint to said surface.

DETAILED DESCRIPTION OF THE PREFERRED EMBODIMENTS

The corrosion inhibitors or adhesion promoters of the present invention may, as indicated, have the formula set forth above. In one embodiment of the present invention the corrosion inhibitor or adhesion promoter has the formula

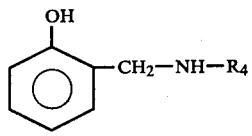

wherein $R_4$ is an aliphatic group, such as an alkyl or alkenyl containing from about 12 to about 22 carbon atoms, preferably an alkyl. More preferably $R_4$ is an alkyl group containing from about 12 to about 18 carbon atoms. Most preferably $R_4$ is coco, as derived from coconut oil, or R represents an octadecyl group.

In the general embodiment of the present invention wherein the corrosion inhibitor or adhesion promoter has the formula

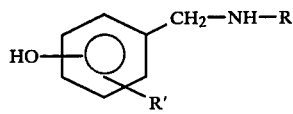

R is preferably an aliphatic group having from about 6 to about 22 carbon atoms. More preferably, the aliphatic groups contain from about 12 to about 18 carbon atoms. The aliphatic groups may be either saturated groups, and thus alkyl, or unsaturated groups, and thus alkenyl. Typically, such groups are derived from, for example, animal fatty acids such as tallow fatty acids or grease acids (from hog fat), hydrogenated tallow fatty acids, and coconut fatty acids.

Illustrative examples of the $C_1$–$C_{12}$ alkyl and alkoxy radicals represented by $R'$ include both branched and straight chain alkyl and alkoxy radicals containing from 1 to 12 carbons. It is preferred that the alkyl and alkoxy radicals represented by $R'$ contain from 1 to 4 carbons. $R'$ is preferably hydrogen or an alkyl group having from 1 to about 4 carbon atoms.

The corrosion inhibitors or adhesion promoters of the present invention may be applied to a metal surface in any convenient manner. Thus they may be sprayed, painted, dipped, or otherwise applied to the metal surface. The inhibitors and promoters may be applied in their concentrated form or may be advantageously applied in the form of solutions, emulsions, or dispersions, as appropriate. Aqueous solutions are often preferred.

The adhesion promoters are typically applied to the metal surface prior to application of the desired paint. However, it is contemplated that the adhesion promoters may be applied as part of the paint itself. In such an instance care should be taken to ensure that the desired paint and adhesion promoters are mutually compatible.

With respect to the length of time a solution, dispersion, or emulsion of an adhesion promoter or corrosion inhibitor of the present invention should be in contact with the metal surface, the time will vary, based upon the particular inhibitor or promoter, the type of metal surface, and the like, as well as the concentration of the solution, dispersion, or emulsion. Useful contact times have been found to be from about 1 to about 10 minutes with from about 1 to about 5 minutes being generally preferred. Useful contact temperature broadly should range from the solidification temperature of the solution, dispersion, or emulsion to the boiling point or decomposition point of the solution, dispersion, or emulsion. It is generally believed that a substantially uniform layer of the corrosion inhibitor or adhesion promoter should be deposited on the metal surface. It is also believed that something approaching a monomolecular layer is sufficient to achieve the desired results.

The metal surfaces which are to be treated in accordance with the present invention may be in any physical form such as sheets, tubes or rolls and may be comprised of any metallic material. Useful metallic materials include iron, steel, and tin, as well as zinc, aluminum, cadmium and their alloys. The metals subject to oxidative corrosion under ambient conditions are of particular importance in the present invention.

The paint which is useful in the practice of the present invention may be of the solvent type consisting of (1) a drying oil, synthetic resin, or other film-forming component or binder, (2) a solvent or thinner, and (3) an organic or inorganic pigment. The paint may also be of the emulsion or latex-type and may thus be comprised of two dispersions, (1) dry powders (colorants, fillers, extenders) and (2) a resin dispersion such as a latex formed by emulsion polymerization or a resin in emulsion form.

In general, the compounds employed in the methods of the present invention may be prepared in accordance with one of the following procedures:

Procedure A: An aliphatic amine of the formula:

R-NH$_2$ wherein R is above defined; is treated with an aromatic aldehyde of the formula

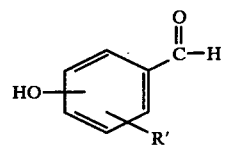

wherein $R'$ is above defined; to yield an imine of the formula:

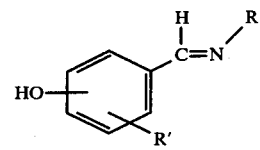

Although the reaction of the amine and aldehyde is exothermic, for ease of reaction and maximum production of the imine a temperature range of 80°–90° C. is preferred. Although no solvent is required an inert solvent such as methanol may be employed for ease of reaction. The imine of formula may then be reduced utilizing techniques such as chemical reduction employing sodium borohydride, or catalytic hydrogenation employing a hydrogenating catalyst such as Raney Nickel to yield the desired amine.

The chemical reduction of the above-described imine with sodium borohydride is generally carried out at low temperatures, i.e. 0°–20° C., in order to control the reaction rate, in the presence of an inert solvent. The inert solvent should be one in which the imine is either soluble or slightly soluble. Selection of such solvents is readily ascertained by one of ordinary skill in the art and includes, for example, methanol, dimethylformamide and the like.

Although not narrowly critical, the catalytic hydrogenation of the imine of the above formula employing a catalyst such as Raney Nickel is generally carried out at 80°–90° C.

Procedure B: An aliphatic amine of the above formula may be treated with formaldehyde and a phenol of the formula:

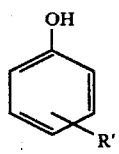

wherein R' is above defined; to yield predominately an amine of the desired formula.

The formaldehyde used in Procedure B may be either an aqueous formaldehyde solution or preferably a methanol solution of formaldehyde. Although the temperature of the reaction may vary over a wide range (20°–200° C.) it is preferred to maintain the reaction temperature within a range of 80°–90° C. Furthermore, although no catalyst need be employed, a Lewis acid catalyst, such as acetic acid or p-toluenesulfonic acid may be utilized.

The reactants utilized in procedures A and B are generally commercially available or may be readily prepared by one of ordinary skill in the art employing known techniques.

Illustrative of the compounds useful in the present process are the following:

| COMPOUND NO. | COMPOUND |
|---|---|
| 1 | N—(2-hydroxybenzyl)cocoamine |
| 2 | N—(3-hydroxybenzyl)cocoamine |
| 3 | N—(4-hydroxybenzyl)cocoamine |
| 4 | N—(2-hydroxybenzyl)octylamine |
| 5 | N—(2-hydroxybenzyl)laurylamine |
| 6 | N—(2-hydroxybenzyl)tetradecylamine |
| 7 | N—(2-hydroxybenzyl)oleylamine |
| 8 | N—(2-hydroxybenzyl)tallowamine |
| 9 | N—(2-hydroxybenzyl)octadecylamine |
| 10 | A mixture of: |
| | (a) 3-(octyloxy)-1-(2'-hydroxybenzylamino)propane |
| | (b) 3-(decyloxy)-1-(2'-hydroxybenzylamino)propane |
| 11 | N—(2-hydroxy-5-methylbenzyl)cocoamine |
| 12 | N—(2-hydroxy-5-methylbenzyl)laurylamine |
| 13 | (2-methyl-4(6)cocoaminomethyl)phenol |
| 14 | (3-methyl-2(4,6)cocoaminomethyl)phenol |
| 15 | (4-ethyl-2-cocoaminoethyl)phenol |
| 16 | (4-lauryl-2-cocoaminomethyl)phenol |
| 17 | N—(2-hydroxybenzyl)stearylamine |
| 18 | N—(2-hydroxy-5-methoxybenzyl)cocoamine |
| 19 | N—(2-hydroxy-5-(1',1'dimethylethyl)benzylcocoamine |
| 20 | N—(2-hydroxy-5-(1',1'dimethylethyl)benzyl)tallowylamine |
| 21 | N—(2-hydroxybenzyl)dodecylamine |
| 22 | A mixture of: |

| COMPOUND NO. | COMPOUND |
|---|---|
| | (a) N—(2-hydroxybenzyl)-s-undecylamine |
| | (b) N—(2-hydroxybenzyl)-s-dodecylamine |
| | (c) N—(2-hydroxybenzyl)-s-tridecylamine |
| | (d) N—(2-hydroxybenzyl)-s-tetradecylamine |

For the purpose of giving those skilled in the art a better understanding of the invention, the following illustrative, non-limiting examples are given.

EXAMPLES I–IV

Sheet metal specimens (10×20 cm) were degreased using trichloroethylene and dipped into solutions containing compounds in accordance with the present invention. After the specimens were dipped, they were rinsed with distilled water and air dried. Paint was subsequently sprayed onto the specimens and baked in for 30 minutes at 150° C. resulting in a dry film of approximately 15 microns. The paint was an epoxy based primer supplied by Lesonal of Stuttgart, West Germany under the designation 01-19511.

Corrosion and adhesion tests were performed in accordance with DIN 50021 (5% NaCl solution, 35° C.). The paint was scratched in cross-direction using a sharp knife and the test panel was positioned in the holder with the painted surface facing upwards. After 144 hours, the panels were removed and brushed. The adhesion of the paint was tested by scraping with a knife.

The specimens were evaluated in terms of the following criteria:
(a) appearance of the paint
(b) adhesion along the scratch line (rust undercutting)
(c) adhesion of the intact layer
(d) degree of rusting For sake of simplicity, all specimens were rated on a scale of 1 to 6. A rating of 1 means the panel was in good condition, exhibiting no signs of undercutting or rusting. A rating of 6 means that the panel exhibited gross undercutting (710 mm), or severe peeling off or easy removal of the paint layer, or rust.

Aqueous solutions were prepared of four compounds 2-hydroxy-5-tertiarybutyl benzyl tallowamine (Example I), 2-hydroxybenzylcocoamine (Example II), 2-hydroxybenzyloctadecylamine (Example III), and 2-hydroxy-5-methylbenzylcocoamine (Example IV), at both 1% and 5% concentrations. Two specimens were treated at 25° C. and at 80° C. for each solution and the exposure time of the panels to the solutions was also varied from 1 to 10 minutes. The results are summarized in Tables I–IV for Examples I–IV, respectively.

TABLE I

| TIME | 1% in $H_2O$ | | 5% in $H_2O$ | |
|---|---|---|---|---|
| | 25° C. | 80° C. | 25° C. | 80° C. |
| 1 min. | 2 | 3 | 2 | 2 |
| | 2 | 3 | 6 | 3 |
| 2 min. | | 3 | | 2–3 |
| | | 3 | | 2–3 |
| 5 min. | 5 | 3–4 | 1– | 2 |
| | 5 | 3–4 | 1– | 2–3 |
| 10 min. | 5 | | 2–3 | |
| | 5 | | 2–3 | |

TABLE II

| TIME | 1% in H₂O | | 5% in H₂O | |
|---|---|---|---|---|
| | 25° C. | 80° C. | 25° C. | 80° C. |
| 1 min. | 2 | 1-2 | 1-2 | 1 |
| | 2 | 1-2 | 1-2 | 1-2 |
| 2 min. | | 1-2 | | 1-2 |
| | | 1 | | 1-2 |
| 5 min. | 3 | 2-3 | 3 | 2 |
| | 3 | 2-3 | 2 | 2 |
| 10 min. | 3-4 | | 4-5 | |
| | 1-2 | | 4 | |

TABLE III

| TIME | 1% in H₂O | | 5% in H₂O | |
|---|---|---|---|---|
| | 25° C. | 80° C. | 25° C. | 80° C. |
| 1 min. | 1-2 | 3 | 3 | 1-2 |
| | 1-2 | 4-5 | 3 | 2-3 |
| 2 min. | | 3 | | 5 |
| | | 3 | | 1-2 |
| 5 min. | 2 | 2 | 3 | 2 |
| | 2 | 3 | 2 | 2 |
| 10 min. | 3-4 | | 4 | |
| | 3 | | 2-3 | |

TABLE IV

| TIME | 1% in H₂O | | 5% in H₂O | |
|---|---|---|---|---|
| | 25° C. | 80° C. | 25° C. | 80° C. |
| 1 min. | 6 | 1-2 | 6 | 6 |
| | 6 | 2 | 6 | 5 |
| 2 min. | | 6 | | 5-6 |
| | | 6 | | 6 |
| 5 min. | 6 | 1-2 | 6 | 5-6 |
| | 6 | 1-2 | 6 | 5-6 |
| 10 min. | 6 | | 6 | |
| | 6 | | 6 | |

From the foregoing results one may conclude the following. In Example I, 2-hydroxy-5-tertiarybutylbenzyl tallowamine achieved better results with a contact time of 5 minutes and a solution concentration of 5%. However, the shorter contact time of 1 minute at the lower temperature of 25° C. also produced favorable results.

With respect to Example II, 2-hydroxybenzylcocoamine, good results were obtained under most conditions except the long contact time of 10 minutes at the higher concentration of 5% produced unfavorable results. The results at 10 minutes and 1% concentration were inconclusive due to the disparity between the panels. The 1 to 2 minute treatment at 80° C. produced results very close to phosphatizing, the panels showing minimal undercutting of 1-2 mm and no rust.

Example III, 2-hydroxybenzyloctadecyl-amine, showed the best results with the lower concentration of 1% and lower temperature of 25° C. and with the higher temperature of 80° C. and higher concentration of 5%.

The results of Example IV, 2-hydroxy-5-methylbenzylcocoamine were not favorable under most conditions. However, good results were obtained at the lower concentration of 1% and the higher temperature of 80° C. at the 1 and 5 minute contact times. The 2 minute contact time was an apparent anomaly.

An attempt to incorporate 1% of the adhesion promoter of the present invention into the paint was not conclusive. The paint applied to phosphatized panels achieved a rating of 1 but the same paint applied to degreased panels resulted in ratings of approximately 4 for all four of the previously discussed promoters. The reason for the poor results apparently was incompatability of the paint with the adhesion promoter, as undissolved particles were found on the panels, subsequent to baking.

EXAMPLES V–XI

Seven steel coupons (3"×6") were dipped into chloroform solutions containing 1% of a compound in accordance with the present invention, except for Examples V, IX, and X, which were for comparative purposes and contained no additive. Examples V, VII, and VIII contained 1% of N-(2-hydroxybenzyl)-octadecylamine and Example XI contained 1% of N-(2-hydroxybenzyl)cocoamine.

The coupons were dipped into the solution for 2 minutes, removed, and the solvent allowed to evaporate. The panels were then lightly wiped with a paper towel. A black acrylate was then sprayed twice onto the coupons and was cured for 72 hours.

The coupons were supported at an angle on plastic racks in a salt spray apparatus and sodium chloride 99.97% pure dissolved in distilled water at a concentration of 5% was used at a temperature of 93° F. and a pH of 6.8–7.0. The test procedure was in accordance with ASTM B-117-73. The results of the testing are summarized in the following Table.

TABLE V

| HOURS TESTED | EXAMPLE V | EXAMPLE VI |
|---|---|---|
| 24 | Appreciable Blistering | Scattered Blistering |
| 48 | No Further Change | Slight Increase in Blistering |
| 72 | Rust in Blisters | Rust in Blisters |
| 96 | Considerable Blistering | No Further Change |
| 120 | Rust Running from Blisters | No Further Change |
| 150 | Blistering in Different Size Blisters over 60% | Blistering over 30% |

| | EXAMPLE VII | EXAMPLE VIII |
|---|---|---|
| 24 | Scattered Blisters | A few Scattered Blisters |
| 48 | Slight Increase in Blistering | Blistering Slightly Increasing |
| 72 | Rust in Blisters | Rust Running from Top |
| 96 | No Further Change | No Further Change |
| 120 | No Further Change | No Further Change |
| 150 | Blistering over 15% | Blistering Over 25% |

| | EXAMPLE IX | EXAMPLE X |
|---|---|---|
| 24 | A Few Scattered Blisters | A few Scattered Blisters |
| 48 | No Further Change | Blistering Increasing |
| 72 | Rust in Blisters | Rust in Blisters |
| 96 | No Further Change | No Further Change |
| 120 | No Further Change | No Further Change |
| 150 | Blistering over 50% | Blistering over 50% |

| | EXAMPLE XI | |
|---|---|---|
| 24 | A few Scattered Blisters | |
| 48 | No Further Change | |
| 72 | Rust in Blisters | |
| 96 | A few More Blisters | |
| 120 | No Further Change | |
| 150 | Blistering over 10% | |

Although the present invention has been described in conjunction with preferred embodiments, it is also understood that modifications and variations may be resorted to without departing from the spirit and scope of the invention as those skilled in the art readily under-

What is claimed is:

1. In a method for painting a metal surface, the step of pretreating said metal surface to improve the adhesion of paint thereto comprising contacting said metal surface with an adhesion promoter of the formula

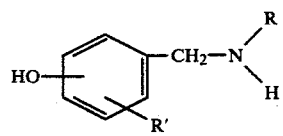

wherein R is selected from the group consisting of aliphatic radicals containing from about 6 to about 22 carbon atoms, $R_1\text{-}(C_mH_{2m})\text{-}$ wherein $R_1$ is alkoxy containing from 6 to 22 carbon atoms and m is an integer of from 2 to 6, and

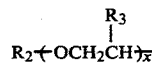

wherein $R_2$ is alkyl containing from 1 to 20 carbon atoms, x is an integer of from 1 to 10 and each $R_3$ is independently hydrogen or methyl; and R' is selected from the group consisting of hydrogen, $C_1$-$C_{12}$ alkyl, and $C_1$-$C_{12}$ alkoxy, at a temperature and for a period of time sufficient to improve the adhesion of paint to said surface.

2. A method for painting a metal surface comprising contacting said metal surface with an adhesion promoter of the formula

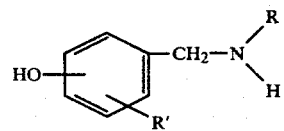

wherein R is selected from the group consisting of aliphatic radicals containing from about 6 to about 22 carbon atoms, $R_1\text{-}(C_mH_{2m})\text{-}$ wherein $R_1$ is alkoxy containing from 6 to 22 carbon atoms and m is an integer of from 2 to 6, and

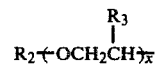

wherein $R_2$ is alkyl containing from 1 to 20 carbon atoms, x is an integer of from 1 to 10 and each $R_3$ is independently hydrogen or methyl; and R' is selected from the group consisting of hydrogen, $C_1$-$C_{12}$ alkyl, and $C_1$-$C_{12}$ alkoxy, at a temperature and for a period of time sufficient to improve the adhesion of paint to said surface and applying paint to said metal surface.

3. The method of claim 1 or 2 wherein the promoter is selected from the group consisting of

COMPOUND

N-(2-hydroxybenzyl)cocoamine
N-(3-hydroxybenzyl)cocoamine
N-(4-hydroxybenzyl)cocoamine
N-(2-hydroxybenzyl)octylamine
N-(2-hydroxybenzyl)laurylamine
N-(2-hydroxybenzyl)tetradecylamine
N-(2-hydroxybenzyl)oleylamine
N-(2-hydroxybenzyl)tallowamine
N-(2-hydroxybenzyl)octadecylamine
A mixture of:
   (a)  3-(octyloxy)-1-(2'-hydroxybenzylamino)propane
   (b)  3-(decyloxy)-1-(2'-hydroxybenzylamino)propane
N-(2-hydroxy-5-methylbenzyl)cocoamine
N-(2-hydroxy-5-methylbenzyl)laurylamine
(2-methyl-4(6)cocoaminomethyl)phenol
(3-methyl-2(4,6)cocoaminomethyl)phenol
(4-ethyl-2-cocoaminomethyl)phenol
(4-lauryl-2-cocoaminomethyl)phenol
N-(2-hydroxybenzyl)stearylamine
N-(2-hydroxy-5-methoxybenzyl)cocoamine
N-(2-hydroxy-5-(1',1'dimethylethyl)benzylcocoamine
N-(2-hydroxy-5-(1',1'dimethylethyl)benzyl) tallowylamine
N-(2-hydroxybenzyl)dodecylamine
A mixture of:
   (a) N-(2-hydroxybenzyl)-s-undecylamine
   (b) N-(2-hydroxybenzyl)-s-dodecylamine
   (c) N-(2-hydroxybenzyl)-s-tridecylamine
   (d) N-(2-hydroxybenzyl)-s-tetradecylamine.

4. The method of claim 1 or 2 wherein the promoter is selected from the group consisting of N-(2-hydroxybenzyl)-octadecyl-amine and N-(2-hydroxybenzyl)-cocoamine.

* * * * *